Feb. 25, 1930. N. D. LEVIN Re. 17,603

MINING MACHINE

Original Filed Feb. 23, 1910 4 Sheets-Sheet 1

WITNESSES:
Harry C. Dean.
Dudley T. Fisher

INVENTOR
Nels D. Levin
BY
H. H. Bliss
ATTORNEY

Feb. 25, 1930. N. D. LEVIN Re. 17,603

MINING MACHINE

Original Filed Feb. 23, 1910 4 Sheets-Sheet 2

WITNESSES:
Harry C. Dean.
Dudley T. Fisher

INVENTOR
Niles D. Levin

BY
H. H. Bliss
ATTORNEY

Feb. 25, 1930. N. D. LEVIN Re. 17,603

MINING MACHINE

Original Filed Feb. 23, 1910 4 Sheets-Sheet 3

WITNESSES:

Harry C. Dean.

Dudley T. Fisher.

Niles D. Levin
INVENTOR

BY

H. H. Bliss
ATTORNEY

Feb. 25. 1930. N. D. LEVIN Re. 17,603

MINING MACHINE

Original Filed Feb. 23, 1910 4 Sheets-Sheet 4

Witnesses
Harry C. Dean.
Dudley J. Fisher

Inventor
Niles D. Levin
H. H. Bliss
Attorney

Reissued Feb. 25, 1930 Re. 17,603

UNITED STATES PATENT OFFICE

NILS D. LEVIN, OF COLUMBUS, OHIO, ASSIGNOR TO THE JEFFREY MANUFACTURING COMPANY, A CORPORATION OF OHIO

MINING MACHINE

Original No. 1,247,419, dated November 20, 1917, Serial No. 545,337, filed February 23, 1910. Application for reissue filed August 1, 1919. Serial No. 314,641.

The invention relates to machines adapted to cut a kerf in the coal preparatory to blasting or otherwise breaking the coal from the solid. One object of the invention is the provision of a machine comprising a wheel mounted base frame adapted to run upon and be laterally braced by a track extending longitudinally toward a vertical coal face and a cutter mechanism movably supported on the base frame and adapted, while so supported, to be moved laterally to cut a horizontal kerf extending transversely from one side of the track to the other. Another object of the invention is the provision of an apparatus such as referred to adapted to move under its own power over the tracks of a mine from one working place to another and to effect the cutting of the coal while standing upon the track, thus obviating the serious loss of time and the labor incident to those machines which must be unloaded from a transporting truck prior to the cutting operation and again loaded upon the truck after such operation. Other objects of the invention relate to the provision of a machine of the character referred to having its cutting mechanism mounted in a novel way in relation to the base frame and provided with means whereby it can be adjusted, operated and controlled in a novel manner. The foregoing objects, and others more or less incident thereto, will be understood from the following description and claims.

I have shown in the accompanying drawings a machine embodying my invention and have illustrated the method to be followed in carrying out my invention, but I do not desire to be limited to the construction shown as there are many changes which may obviously be made.

Referring to the drawings,

Fig. 9 is a fragmentary cross sectional view showing the details of the mounting for the turntable locking latch.

Figure 1:
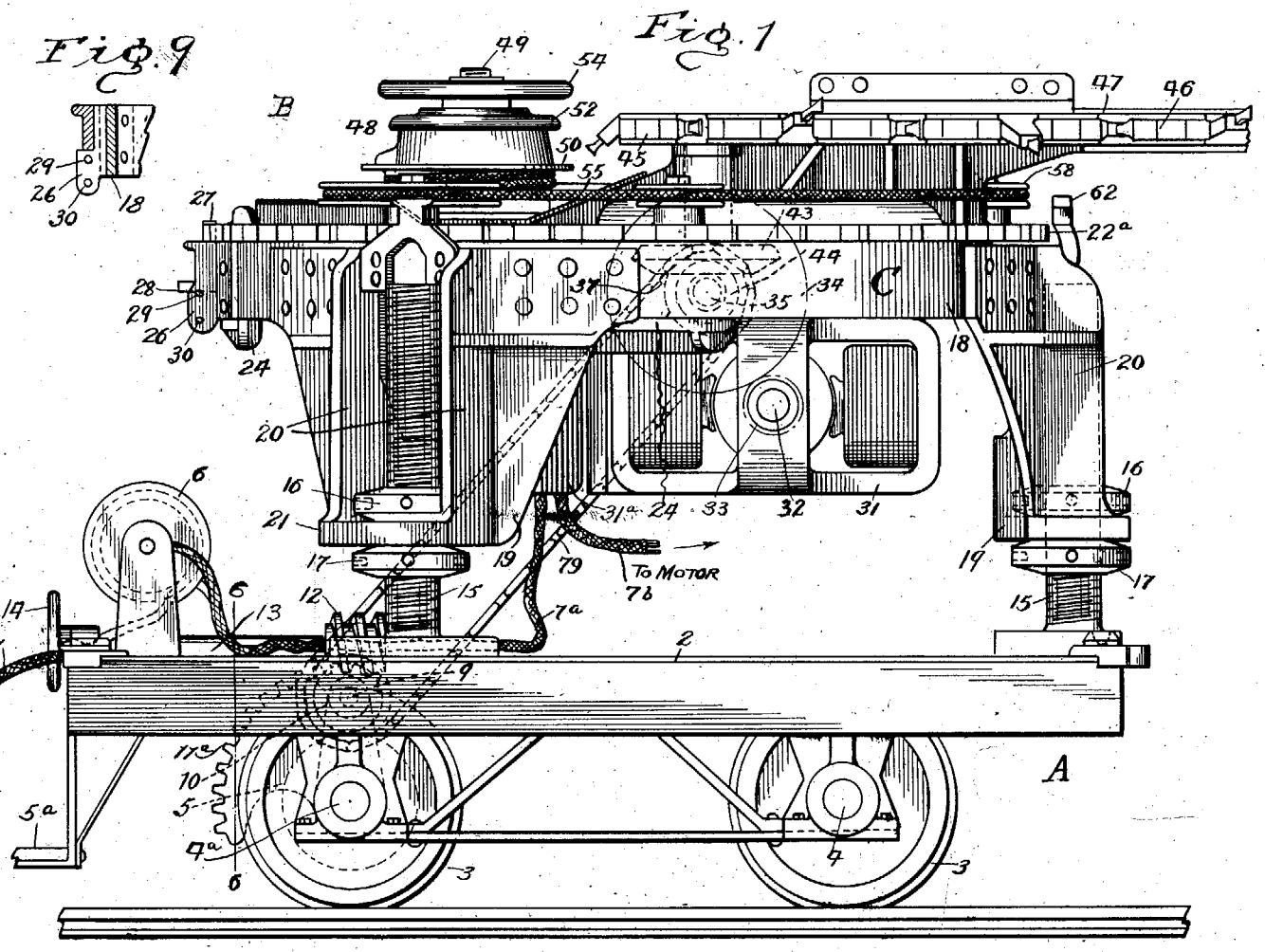
Figure 1 is a side elevation of the machine embodying my invention.
Figure 2:
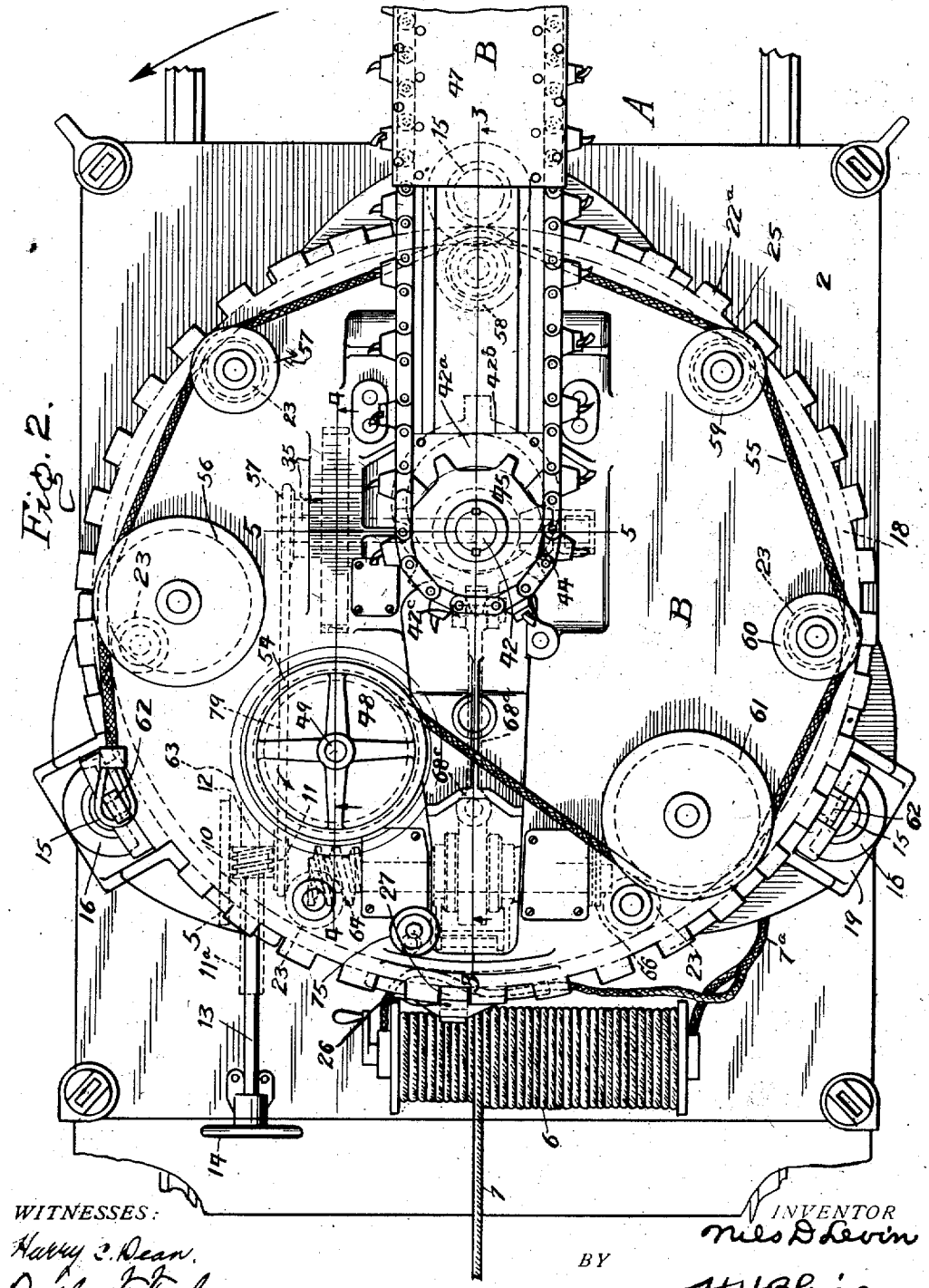
Fig. 2 is a plan view.

The machine illustrated in the drawings comprises a wheeled base frame or truck A, a cutting mechanism B of the endless chain type and an intermediate frame C. The cutting mechanism is supported on the frame C so as to swing laterally while cutting and the frame C is itself vertically, and preferably angularly, adjustably supported on the truck, so that kerfs can be cut at various heights and inclinations.

Power means are provided for rotating the wheels of the truck and preferably the power means consists of a train of power transmitting devices adapted to be connected with a driving motor. In the construction shown these devices are connected with the motor which is carried by and which drives the cutting mechanism, a part of the train of devices being carried by the cutting mechanism and a part directly by the truck. The two sets can be connected when the cutting mechanism and the motor are properly adjusted with respect to the truck. These parts will be again referred to below and described in detail.

The truck A comprises the rigid platform or base frame 2, which is mounted upon the track wheels 3, 3 rigidly secured to the axles 4, 4[a]. The wheels are thus fixed relatively to the base frame, although rotatable about their axes. A step 5[a] is preferably provided at the rear end of the truck. 6 is a cable reel, which may be of any usual or preferred construction. Upon the reel 6 there is wound a suitable electric cable 7 adapted to have its conductors suitably connected at its free end with a suitable source of current supply, such as the conductors in the entry of a mine. With this cable are made electrical connections to the motor to be hereinafter described.

Those of the above mentioned power transmitting devices for rotating the truck wheels which are mounted on the truck itself will now be described, it being, of course, understood that as concerns the details of these devices there can be variation. To one of the axles, as for instance 4[a], there is secured a driving gear 5. Adjacent the gear 5 and rotatably mounted on the axle is a bracket 8, which has two parallel arms 8[a] and 8[b]. At the ends of the arms are provided bearings in which is rotatably mounted the jack shaft 9. This jack shaft 9 carries at one end a pinion 10 which meshes with the gear 5. Near the other end between the bearings on the arms 8[a] and 8[b] there is mounted a sprocket wheel 11.

A gear segment 11[a] which is concentric with the axle 4[a] is secured to one of the arms as, for instance, 8[a]. As shown in the drawings the parts 8[a], 8[b], and 11[a] comprising the bracket 8 may be formed as one integral piece. The segment 11[a] is provided with worm teeth which are adapted to mesh with the worm 12. The worm 12 is secured to the rotatable shaft 13 which is mounted in suitable bearings and which extends to the rear end of the truck and carries the hand wheel 14.

It will be noted that the power applied to the sprocket wheel 11 will be transmitted through the shaft 9 and the gears 10 and 5 to the axle 4. The position of the sprocket wheel 11 may be changed without affecting the operation of this power transmitting gearing. This may be done by a rotation of the hand wheel 14 which acts through the shaft 13, the worm 12 and the worm segment 11[a] to turn the bracket 8 about the axle. The worm and wheel gearing makes the device self-locking, as any force applied to the gearing or the sprocket wheel will not move the worm to permit a change of position of the bracket 8.

The devices for supporting and adjusting the cutting mechanism comprise, in addition to the intermediate frame C, vertical studs or uprights which are mounted on the truck frame and arranged to define a polygon in horizontal plan. The studs are fixedly held in their upright positions. As shown there are three studs 15, 15, 15 arranged to define an equilateral triangle. Preferably one of these is mounted in the center of the machine at the front end, the others being symmetrically located near the rear end. Each of the studs is threaded and is provided with two nuts 16 and 17, which have beveled surfaces and which are provided with radial apertures for the insertion of a bar or spanner wrench for turning.

Figure 3:
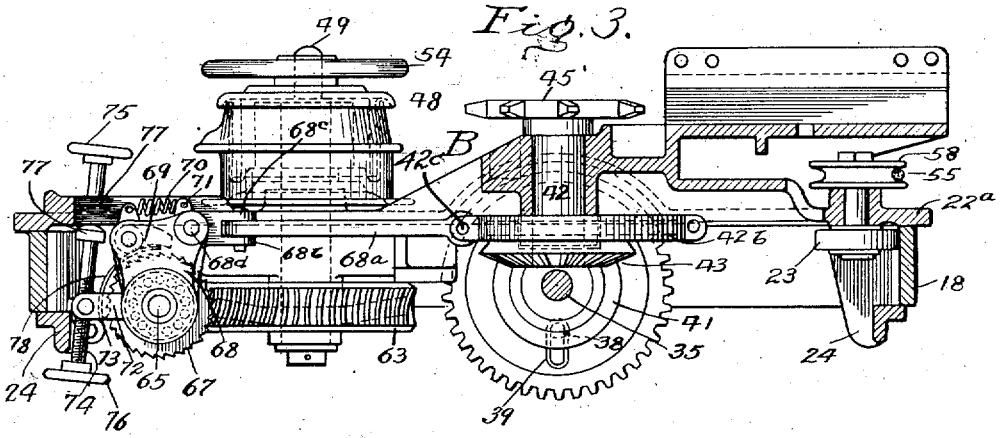
Fig. 3 is a fragmentary cross sectional view taken along the line 3—3 of Fig. 2.
Figure 4:
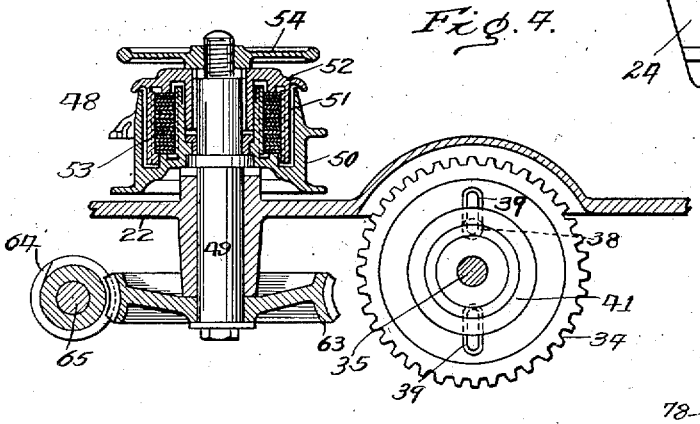
Fig. 4 is a fragmentary cross sectional view taken along the line 4—4 of Fig. 2.
Figure 7:
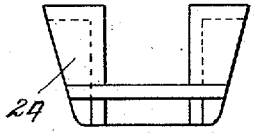
Fig. 7 is a detail view of one of the retaining clips for the turntable.
Figure 8:
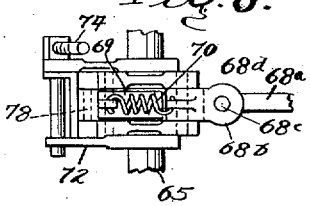
Fig. 8 is a fragmentary plan view with some of the parts of the machine removed to show the details of the feed mechanism.

The intermediate frame C as here shown comprises a circular ring 18 preferably rectangular in cross section, as shown in Fig. 3. Equally spaced about this ring are three depending brackets 19 which comprise two parallel side bars 20, 20 and a horizontal yoke 21 at the bottom of the said bars and having an aperture adapted to receive one of the studs 15.

On each stud below the yoke 21 is located a nut 17. On each stud above the yoke is located a nut 16. The apertures in the yoke 21 are sufficiently large to permit a certain amount of lateral movement of the yokes relative to the studs. It will be seen that by a proper adjustment of the nuts 17 the brackets 19 with the ring 18 may be raised or lowered or adjusted to any desired angle relative to the truck. The nuts 16 serve as lock nuts to hold the brackets in their adjusted positions and to frictionally lock the nuts 17 by pressure transmitted through the yoke 21.

When the parts are assembled as described the rigid frame C serves to ties the vertical supporting studs 15 together so that they mutually brace each other. This action of the frame C is especially advantageous when it is adjusted well toward the top of the studs as it insures a strong, rigid frame structure.

As concerns the cutting mechanism B it is essential that it be movably mounted relatively to the base frame so that it can cut a horizontally extending kerf across the front of the truck. In the construction illustrated the cutting mechanism is movable horizontally with respect to the intermediate or supporting frame C and comprises a rotatable table or frame 22[a] upon which the various operative parts are supported. This frame rests directly on the top of the ring 18 and is adapted to rotate relative thereto. A series of rollers 23 are rotatably mounted on the under side of the frame 22[a] and are adapted to engage the inner surface of the ring to guide the frame 22[a] in its rotation. A series of brackets or clips 24 are provided which are attached to the under side of the frame 22[a] and engage the under side of the ring 18 to prevent the frame from moving upward relative to the ring.

As will be fully explained below, the cutting mechanism can be used either when moving relatively to the truck or when it is locked thereto and the whole machine is moved bodily. In order that the cutting mechanism may be locked in various angular positions to the intermediate frame, the outer edge of the frame 22ᵃ is provided with a series of notches 25. A bearing 26 is secured to the ring 18 and in this bearing there is slidably mounted a latch 27 which, in its upper position, will engage one of the notches 25 and thus prevent the table 22ᵃ from turning. When the latch is in its lower position, it is disengaged from the frame notches 25 and the table is left free to turn. The latch may be held in either position by means of a pin 28, which may be inserted in either of the holes 29 and 30.

Figure 5:
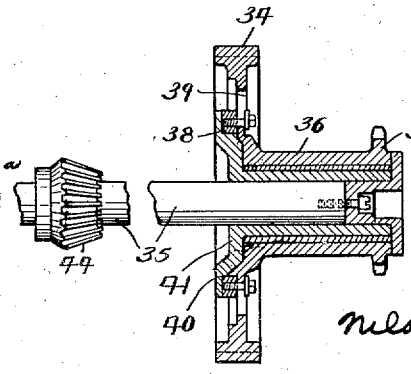
Fig. 5 is a fragmentary cross sectional view along the line 5—5 of Fig. 2.

Electric power is provided for operating the machine, that is, for driving the cutters, for moving the cutting mechanism relatively to the truck or for moving the entire machine bodily (as will be more fully explained below) and for rotating the truck wheels to transport the machine. As concerns the construction and arrangement of the electric motive mechanism there can be modification, but as shown there is an electric motor 31 carried by the truck and bodily movable therewith. Preferably it is suspended from the table 22. 31ᵃ is a controller for the motor and is preferably mounted on the motor frame. Suitable electrical connections are provided for the controller and motor. As shown, the connections comprise a cable 7ᵃ extending from the cable reel 6 to the controller 31ᵃ, and a cable 7ᵇ extending from the controller to the motor, said cables having conductors suitably connected at their respective ends to the terminals of the cable reel, controller and motor to form an operative electrical connection between the conductors of cable 7 and the motor 31. I have not shown these electrical connections in detail because any of the well known arrangements of conductors, fuses, switches, etc., which is suitable for the purpose indicated, can be used. The motor is provided with the shaft 32 carrying the driving pinion 33. The pinion 33 meshes with the gear 34 which is rotatably mounted on the shaft 35. As shown in Fig. 5 the gear 34 is connected to a quill or sleeve 36, to the outer end of which is connected a sprocket wheel 37. The gear 34, with the sleeve 36 and the sprocket wheel 37, is rotatable on the shaft 35 and may be secured to it by means of the pins 38 which may be moved readily inward or outward in the slots 39 to engage or disengage the notches 40 in the flange 41 which is connected to the shaft 35.

Referring now to the cutter devices, 46 is an endless cutter-carrying chain suitably supported and guided for movement around the periphery of a relatively narrow, elongated cutter arm 47 which is rigidly secured to and projects horizontally from the frame or table 22ᵃ, preferably in an elevated position, as shown, the table 22ᵃ and arm 47 thus constituting a laterally movable cutter frame. For driving the chain 46 there is provided a sprocket wheel 45 mounted at the upper end of a vertical shaft 42 which is mounted in a suitable bearing on the frame 22ᵃ. This shaft is located directly above the shaft 35, but both shafts are preferably located at one side of the center of the frame 22ᵃ. The shaft 42 is provided at its lower end with a bevel gear 43 which meshes with a bevel pinion 44 on the shaft 35.

As concerns the power actuated mechanism for moving the cutting mechanism relatively to the base or truck frame and for moving the entire machine bodily, there can be variation, but I prefer the mechanism shown, which comprises a suitable cable adapted to be wound upon a drum which is driven by the aforesaid motor 31.

48 represents as a whole the winding drum. 49 is a vertical shaft for the drum and is rotatably mounted in a suitable bearing on the frame 22ᵃ. 50 represents the drum proper which is mounted to be capable of rotation independently of the shaft 49, but which may be connected thereto by means of the clutch mechanism 51. This clutch mechanism comprises the driving member 52 which is keyed to the shaft 49 and disks 53, which are secured alternately to the driving member 52 and the drum member 50. By means of the hand wheel 54, which engages the upper threaded part of the shaft 49, the disks may be forced together to frictionally engage each other, power being thus transmitted through the driving member 52 to the drum 50.

A cable 55 is connected to the drum 50 and is adapted to be wound upon it. The cable passes from the drum 50 over a series of sheaves 61, 60, 59, 58, 57 and 56. After passing over the last guide sheave the cable can have its end suitably secured at any desired point outside of the machine so as to move the machine bodily when the cutting mechanism is locked against relative movement. Such an arrangement is shown in Figs. 13, 14, 17 and 18. If it is desired to swing the cutting mechanism relative to the truck frame, the end of the cable may be secured to one of the cable holders 62 which are attached to the ring 18, preferably above the brackets 19, such an arrangement being exemplified in Figs. 10, 11, 12, 15 and 16. These figures, and also Figs. 13, 14, 17 and 18, will hereinafter be explained more fully. I have described the cable 55 as passing over all of the sheaves. It will be understood, however, that this is not necessary and depends entirely on the position of the table relative to the point of attachment of the cable. It will be noted that the sheaves 56 and 61 are larger than the others, the reason for this being that the cable must be turned through a greater angle in passing over these sheaves.

At the lower end of the shaft 49 is a worm wheel 63 which meshes with a worm 64 mounted on the shaft 65. The shaft 65 is parallel to the shaft 35 and is rotatable in suitable bearings on the frame 22[a]. A ball thrust bearing 66 is preferably provided to take the end thrust of the shaft 65 due to the re-action of the worm 64 and the wheel 63. 67 is a ratchet wheel mounted on the shaft 65 midway between its bearings and on the center line of the machine. On each side of the ratchet wheel 67 is located a bracket 68 which is rotatable about the shaft 65. Between the two brackets 68 there is mounted a pawl 69 which is adapted to engage the ratchet wheel 67. The spring 70 engages at one end with the pawl and at the other end with a pin 71 which extends between the brackets 68. This spring tends to hold the pawl 69 in operative engagement with the ratchet wheel 67.

An eccentric 42[a] is mounted on the shaft 42 and carries a strap 42[b]. The strap 42[b] is connected by means of a horizontal pivot 42[c] to a connecting rod 68[a]. A yoke 68[b] is connected to the connecting rod by means of a vertical pivot 68[c] and to the arms 68 by means of a horizontal pivot 68[d]. By means of this construction the arms 68 are rocked backward and forward about the shaft 65 as the eccentric is rotated, the pawl 69 being thus given a reciprocatory movement whereby it may engage the ratchet wheel 67 to intermittently rotate it. The horizontal pivots 42[c] and 68[d] permit the vertical movement of the rod 68[a] which is incidental to the swinging of the arm 68. The vertical pivot 68[c] permits the rod 68[a] to move laterally with the eccentric strap 42[b]. On each side of the ratchet wheel 67 and preferably outside of the brackets 68 are two arms 72, each rotatably mounted at one end of the shaft 65. The outer ends of these arms are connected by a pivotally mounted yoke 73, which has a threaded aperture through which passes the threaded adjusting rod 74. Hand wheels 75 and 76 are provided at the upper and lower ends of this rod. The rod passes loosely through a suitable aperture in the frame 22[a] and collars 77 are secured to the rod at each side of the frame and serve to prevent movement of the rod through the aperture. An arcuate finger 78 is rigidly attached to the arms 72 and is concentric with the shaft 65 and the ratchet wheel 67. The finger 78 is of such length that it may be adjusted to engage the pawl 69 and hold it out of engagement with the ratchet wheel during a part of its movement.

The sprocket wheel 37 is located at such a distance from the center of the machine that it will be in alinement with the sprocket wheel 11 when the table 22[a] is in position, as shown in the drawings, with the cutter frame 47 parallel to the track. When the parts are in this position, a chain 79 may be passed over the sprocket wheels 37 and 11 and may serve to transmit power from the motor 31 to the driving wheels of the truck.

The sprocket wheel 37 and the chain 79 serve to complete the before-mentioned train of power transmitting devices between the motor and the truck wheels.

Figure 6:
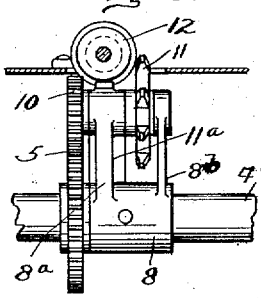
Fig. 6 is a fragmentary cross sectional detail view of the driving gear adjustment taken along the line 6—6 of Fig. 1.

The operation of the machine is as follows: When it is desired to move the machine from place to place about a mine or elsewhere the table 22[a] is swung to the position shown in the drawings and the chain 79 is put in place on the sprockets 37 and 11. In order that but one length of chain need be provided for various vertical adjustments of the machine, the mechanism shown in Figs. 1 and 6 has been provided. As has been previously described, the sprocket wheel 11 may be swung about the axle 4 by rotation of the hand wheel 14. As it swings about the axle its distance from the sprocket wheel 37 is changed, and by a proper adjustment its position may be accommodated to any vertical position of the sprocket wheel 37. This adjusting mechanism also furnishes a means for tensioning the chain 79 and makes it possible for the chain to be readily placed on the sprocket wheels and afterward tightened. When the machine is to be driven by means of this mechanism, the shaft 35 is disengaged from the motor by moving the pins 38 out of the notches 40 in the flange 41 and locking them at the outer ends of the slots 39. Power is then transmitted from the motor through the gears 33 and 34 and the sleeve 36 to the sprocket wheel 37 and from this sprocket wheel to the axle 4[a] and the wheels 3 by means of the mechanism which has been previously described.

When the machine is in position for making a cut in the coal the chain 79 is removed and the table 22[a] is adjusted to the proper elevation and the proper angle by means of the nuts 16 and 17 on the studs 15. The shaft 35 is connected to the motor by means of the pins 38 and power is thus transmitted from the motor through the gears 33 and 34, to the shaft 35, the gears 43 and 44 to the shaft 42 and the sprocket wheel 45 which drives the cutter chain 46.

The feed cable 55 is placed in position on the feed drum 50 and the various sheaves in the manner which has been previously described. The end of the cable may be fastened to one of the cable holders 62 or it may be anchored in a convenient manner at a point external to the machine, according to the manner in which the machine is to be used. By means of the friction clutch 51 which may be thrown into engagement by the hand wheel 54, the drum 50 is connected to the shaft 49. This shaft is intermittently rotated through the wheel 63, the worm 64, the shaft 65 and the ratchet wheel 67 by means of the pawl 69 which is operated by the eccentric 42[a]. The worm and wheel mechanism acts as a self-locking device to prevent the reverse movement of the drum when the pawl is moving backward on the ratchet wheel. As the drum is rotated, the cable 55 is wound upon it and the table 22 is slowly rotated upon its supporting frame, the moving cutter chain being thus forced through the coal. The operation of the machine is not confined to a rotation of the table and cutting mechanism relative to the supporting frame. The table 22a may be locked by means of the latch 27 in any desired position, as for instance with the cutter frame 47 at right angles to the track, as in Fig. 13, or at an inclination to the track, as in Figs. 14, 17 and 18. With the parts in such a position, the cable 55 may be attached to a point external to the machine and the whole machine drawn along the track, the cutter chain being forced through the coal by means of the winding of the cable on the drum.

It will be noted that the friction clutch 51, by means of which the drum is connected to its rotating mechanism, furnishes a safety device adapted to prevent too rapid feeding of the cutting mechanism through the coal. The friction clutch may be set by means of the hand wheel 54 to yield at a desired resistance, and in this way it is impossible for force beyond a certain predetermined amount to be transmitted to the cutters.

The rate of feed may be adjusted by means of either of the hand wheels 75 and 76 which control the finger 78. As has been previously stated, the finger 78 is adapted to engage the pawl 69 to hold it out of engagement with the ratchet wheel 67 during a part of its movement. The finger 78 may be swung so far backward as to not interfere at all with the pawl 69, in which case the pawl at each reciprocation would rotate the ratchet wheel 67 through an angle corresponding to say six notches. When the finger 78 is swung forward a certain amount it will engage the pawl 69 during the first part of its operative stroke and hold it out of engagement with the ratchet wheel until a certain number of notches, which may be varied, say from one to five, have been passed. In this way, by simply turning one of the hand wheels 75 or 76 the rate of feed of the machine may be varied through a wide range.

Prior to my invention, it has been customary to cut kerfs in coal faces at or near the bottom thereof. In many mines, however, conditions are encountered which make it preferable to cut the kerf at or near the top of the seam, or at some point between the top and the bottom. This is especially the case in mines where there are present in the coal seam bands or layers of impurities which must not be mixed with the coal. These layers are, of course, at different heights in different mines, and even vary markedly in height from place to place in the same mine. In fact, even in a given room the layer or band of dirt may be inclined so as to be much higher at one side than at the other. When such dirt bands are encountered, a machine embodying my invention can be used to cut them out; that is, the cutting mechanism is adjusted vertically, and angularly, if necessary, so that it will follow the dirt band and remove it, thus performing the double function of getting rid of the dirt and forming a kerf to permit shooting of the coal.

In order that the manner of utilizing my invention and my method of forming kerfs may be clearly understood, I have indicated in the diagrammatic Figs. 10 to 18 of the drawings several of the ways in which my machine can be used, and these I will now briefly described.

Figure 10:
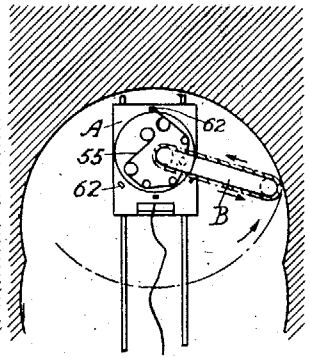
Figs. 10 and 11 are diagrammatic views showing one way in which the machine can be operated. In these views the machine is shown as cutting a room or any entry.
Figure 11:
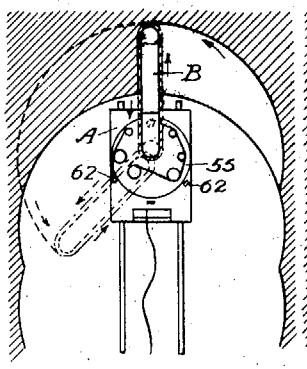

Referring first to Figs. 10 and 11, it will be observed that the machine is here shown as operating on a track which extends along the center of a room to the face which is to be cut. From the mine entry the machine advances under its own power into the room and is brought to a position as close as convenient to the face of the coal. The cutting mechanism having been extended toward the right, as shown in Fig. 10, the cable 55 is passed around the several sheaves and secured to one of the holders 62 as shown. The cutting mechanism is then set in motion and the cable is wound so as to swing the cutting mechanism from right to left to cause it to cut a semicircular kerf extending from one side of the room to the other. In Fig. 11 the kerf is shown half cut and the dotted lines indicate the position of the cutter after the completion of the cut.

It will be understood that the cutter mechanism can be adjusted as desired either vertically or angularly at the beginning of the cutting, or at any time during its progress, to follow inclinations and irregularities in the dirt band which is being cut, or to effect such variations in the kerf as may be desired for other reasons.

Ordinarily, as soon as the kerf has been completed, the machine is moved from the room under its own power, in the manner previously described, and thence through the mine entry to another room where the operation is repeated. Thus, during a working period or shift, a considerable number of room faces will be cut preparatory to the breaking down of the coal.

Figure 12:
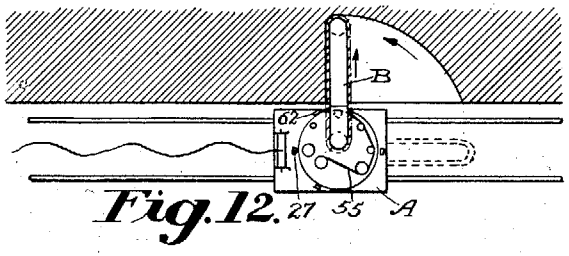
Figs. 12 and 13 are diagrammatic views showing other ways in which the machine can be operated. In these views the machine is shown as cutting according to the longwall system.

In Fig. 12 the machine is shown working on a track parallel with the coal face to be cut. In starting the operation the feed cable is passed around several of the sheaves and connected to one of the holders 62. Then the cutters and the winding drum are set in motion causing the cutter bar to swing from right to left, or counter-clockwise, from the position shown in dotted lines, to that shown in full lines. When this full line position is reached the feed is stopped and the cable is loosened, taken off from the holder 62 and extended along the face to a suitable jack 80 in the manner indicated in Fig. 13. The cutting mechanism is then locked against swinging and the winding drum again started. The draft of the cable now serves to draw the entire machine along the track, the cutters meantime forming the kerf.

Figure 13:
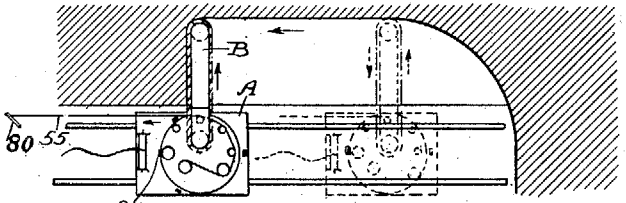
Figure 17:
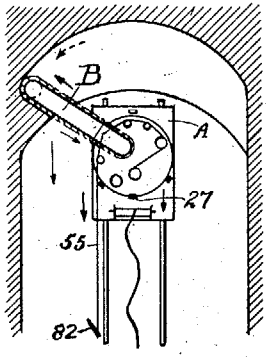
Figure 18:
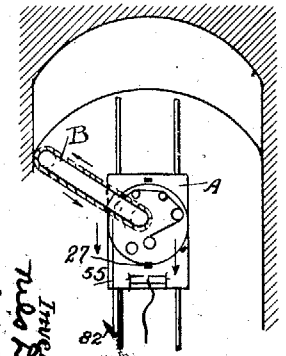

In Fig. 13 the operation is similar to that described in connection with Fig. 12, the former figure being designed to show the manner in which the machine can be used to start a kerf adjacent a side wall or rib. The dotted lines indicate the position of the machine after the cutter has been swung under the coal and the cable carried along the face to a jack. The full lines indicate the position of the machine after the cutting operation has progressed some distance. It will be understood that when the machine is worked in the ways indicated in Figs. 12 and 13, the cutter mechanism can be adjusted vertically and angularly in the manner previously described.

Figure 14:
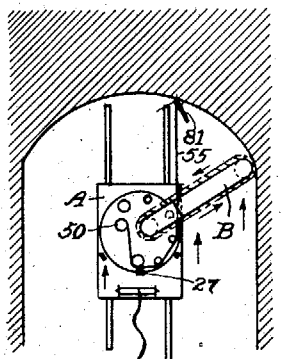
Figs. 14 to 18 are diagrammatic views showing still another way in which the machine can be operated. In these views the machine is shown as operating in another way to cut a room or entry.
Figure 15:
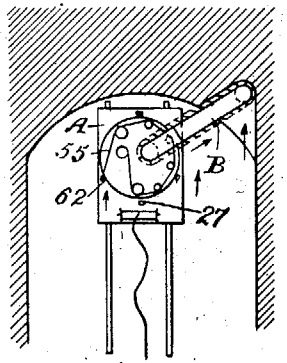
Figure 16:
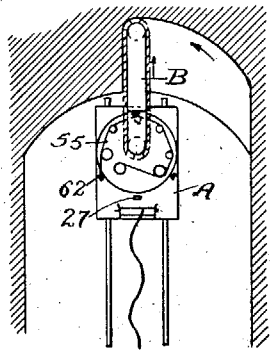

Referring to the operation as shown in Figs. 14 to 18, it will be observed that here again, in practicing the method here contemplated and illustrated the machine is shown as operating on a track which extends along the center of a room. In starting the cut the cutter arm is positioned as shown in Fig. 14 and is located in place relatively to the truck. The cable 55 is carried from the drum 50 over some of the guide sheaves and extended forward to a suitable anchor or jack, as indicated at 81. The cutting mechanism is then started, and by means of the cable the entire machine is drawn forward to the position indicated in Fig. 15. Then the cutting mechanism is unlocked so as to be free to swing and the cable 55 is carried around the sheaves and secured to one of the holders 62, as indicated in Fig. 15. Winding of the cable is then resumed and the cutting mechanism is forced to swing toward the left through the position indicated in Fig. 16 and to the position indicated in Fig. 17. Then the winding of the cable is stopped, the cable is removed from the holder 62 and is carried back to a suitable anchor at 82. The cutting mechanism is locked in position on the truck and the cable is wound to draw the entire machine back to the position indicated in Fig. 18, the cut being then complete.

It will be understood, of course, that the methods of operating the machine indicated in Figs. 10 and 11, and 14 to 18, are applicable to the driving of entries as well as to room and pillar cutting which has been referred to in the foregoing description.

From the foregoing description it will be seen that the machine is adapted for the cutting of a kerf which extends across one end of the machine from a longitudinal vertical plane at one side of the track to a longitudinal vertical plane at the other side of the track, and, furthermore, that it is well adapted for the cutting of a kerf having two end walls parallel to each other and to the central track and having a third connecting wall which extends transversely across the central vertical plane of the machine from one to the other of the two end walls. For the cutting of a kerf such as last referred to, I prefer a construction such as illustrated in which the cutter apparatus is mounted on the base frame to swing about a relatively fixed axis, but it will be understood that so far as many of the features of my invention are concerned, this is not essential, and other ways of mounting and guiding the cutter apparatus can be used.

In room and pillar work my improved machine, particularly when it is used in the ways above described to form the kerf across the face by a swinging or arcuate cut, has a working capacity greatly exceeding that of any prior kerf cutting machine known to me. I attribute this largely increased working capacity to the fact that the machine is adapted to form a kerf from side to side of the room while it, as an entirety, stands on the track over which it approaches and leaves the working face, together with the fact that the power mechanism of the machine, in connection with the electric cable and reel devices, affords means adapted to drive the track wheels to transport the machine over the mine tracks from room to room. Under its own power the machine moves over the mine tracks at an ample speed and, when the face of the coal is reached, no time is consumed, as in the case of other types of machines, in unloading the cutting mechanism and in reloading it after the kerf has been cut. In this connection it is to be noted also that while there can be considerable variation in the cutter mechanism proper in so far as some features of my invention are concerned, it is essential, when the machine is to be operated in the manner last referred to above, that a cutter mechanism, substantially such as I have shown and described, be provided. In order to attain a working capacity such as is attained, it is necessary that the machine be capable of cutting by the swinging movement of the cutters, a face of considerable length measured from pillar to pillar. In other words, the cutter mechanism must have a wide reach beyond the base frame or truck, and this means extremely severe stresses which must be provided for in the construction of the cutter mechanism and in the mounting of the same upon the base frame. By the use of endless chain cutters mounted on a narrow elongated cutter arm having a widely extended bearing support directly above the wheel base of the machine, I find it possible to attain a radial reach for the cutters which would be quite impossible with other forms of cutter mechanism, such, for example, as disk or wheel cutters which are limited in practice to relatively small diameters, and rotary bar cutters in which the entire force of the reaction of the coal on the cutters must be transmitted through the bearing in which the bar is rotatably supported at its extreme end. Also, in my improved machine, it is important that the frame structure of which the aforesaid wide bearing support is a part should have a correspondingly wide ground support and that it be sufficiently rigid to transmit the severe working stresses to the track rails without being materially strained or racked. This requirement can be met with different forms of frame structure but, when the cutter frame is to be vertically adjusted through a relatively wide range, I prefer a structure of the character shown having a rigid base disposed relatively close to the ground and carrying upwardly extending supports for the cutting mechanism.

In the construction shown and described the upright supports 15 are rigidly and fixedly mounted on the truck frame and the cutting apparatus is both vertically adjustable and laterally movable in relation to said supports; but my invention, in its broader aspects, is not to be understood as limited to such a relation of the parts, for it is obvious that provision for the lateral swinging movement of cutting apparatus vertically adjustably mounted on upright supports, can be made in other ways. Obviously, the vertical adjustment on the upright supports can be effected by other means than screw threads and nuts, though that is the means which I prefer.

I have shown the cutter mechanism as located near the uppermost plane of the machine, and this is the preferred construction, as it is there that the dirt bands referred to are most frequently found; but it will be understood that the invention is not limited in this respect, and may be modified to meet the conditions for which it is intended to be used. Another reason why the location of the cutting mechanism shown is the preferred one is that in many cases it is found preferable to cut the kerf near the roof instead of near the floor, and to shoot the coal up instead of down, as was customary prior to my invention. It has been found that when the coal is shot up it is left in larger pieces and therefore is more suitable for use; and it has, furthermore, been found that there is less tendency to shatter the roof when the coal is shot up than when it is shot down.

The motor is preferably mounted, as shown, to be movable with the cutting apparatus, but it will be understood that as to this there can be variation as concerns certain features of the invention.

The mechanism which I have provided for moving the cutter mechanism horizontally has many features of advantage. The mechanism is frictionally driven, and the frictional devices act to limit the amount of force which can be transmitted. If the cutters strike a hard place the friction devices will slip and prevent breakage. The feed is variable in rate, so that it can be adjusted in accordance with the character of the material and the depth of the cut. Furthermore, the rate of feed is adjustable while the cutting mechanism is in operation, this being especially important in a machine of this class in which, during a swinging semicircular cut, as indicated in Figs. 10 and 11 the cut is relatively shallow at the beginning and at the end and relatively deep at the center. I have provided means whereby the rate of feed can be made relatively rapid at the ends of the cut and relatively slow at the center without stopping the action of the cutting mechanism. The provision of a rope for effecting the feeding is advantageous, as it enables the connection to the base frame to be made quickly and conveniently at any one of several points; and as it, furthermore, makes possible the use of the same feeding mechanism either for turning the cutter arm on the base frame or for moving the whole machine bodily along the track.

I do not herein claim as a part of my present invention a wheel supported base frame or truck, cutting apparatus movably mounted thereon, a rotatable reel and a cable thereon for supplying electric current to the machine, as such subject-matter is presented in my copending application for mining machines and trucks, Serial No. 579,798, filed August 31, 1910, upon which Patent No. 1,137,337 was granted April 27, 1915.

I do not herein specifically claim a mining machine having cutting apparatus adapted to form a kerf in relatively high horizontal planes and a kerf in relatively low horizontal planes arranged so that said cutting apparatus cannot form horizontal cuts in the coal between the first aforesaid horizontal planes and the second aforesaid horizontal planes; that is to say, I do not specifically claim cutting apparatus combined with and supported on a horizontally mounted vertically rotating carrier adapted to swing vertically around the axis of the said carrier to form a horizontal kerf in relatively higher horizontal planes and then swing the axis of said carrier to a position which can form a horizontal kerf in relatively lower horizontal planes.

What I claim is:

1. In a mining machine, the combination of a wheel-supported rigid base frame adapted to run upon and be braced by the rails of a mine track, a laterally movable endless chain cutter apparatus carried by the base frame and projecting horizontally therefrom, supporting means between the cutter apparatus and the base frame comprising a plurality of upright supports extending upward from the base frame and held in upright positions at the angles of a relatively widely extended horizontal polygon and connections between each of the upright supports and the cutter apparatus for sustaining said apparatus and adjusting it vertically in relation to the base frame, and driving connections whereby the power of said motor devices is caused to drive the cutter apparatus and move it laterally, thereby forming an elongated horizontally extended kerf.

2. In a mining machine, the combination of a wheel-supported rigid base frame adapted to run upon and be braced by the rails of a mine track, a plurality of upright supports mounted directly on the base frame and extending upward therefrom at the angles of a relatively widely extended horizontal polygon, a rigid cutter frame comprising a widely expanded turn table and an elongated cutter arm projecting laterally from said table and from the base frame, means carried by and vertically adjustable on the upright supports forming a bearing support for the turn table, an endless cutter chain mounted on the cutter arm, motor devices carried by the base frame, and driving connections whereby the power of said motor devices is caused to drive the cutter chain and to move the arm laterally, thereby forming an elongated horizontally extended kerf.

3. In a coal cutting machine, the combination of a wheel-supported rigid base frame, three upright threaded studs mounted on the base frame at the angles of a horizontal triangle, a cutter mechanism, a supporting frame upon which the said mechanism is rotatably supported, and nuts on the upright studs for sustaining and vertically adjusting the supporting frame and cutter mechanism.

4. In a coal cutting machine, the combination with a movable base, of three equidistantly disposed vertical threaded studs, a supporting frame comprising three brackets with apertures which the studs are adapted to enter, nuts adjustable on the studs and adapted to engage the brackets, a coal cutting mechanism and a supporting table for the said coal cutting mechanism rotatably mounted upon the supporting frame, substantially as set forth.

5. In a coal cutting machine, the combination with a movable base, of three equidistantly arranged vertical threaded studs, a supporting ring, brackets connected to the ring and having apertures through which the studs are adapted to pass, nuts on the studs and adapted to engage the brackets, a coal cutting mechanism and a supporting table for the coal cutting mechanism supported by the said ring and mounted to rotate relatively thereto, substantially as set forth.

6. In a coal cutting machine, the combination with a movable base, of a horizontal supporting ring mounted on the base, means for adjusting the ring vertically and angularly with respect to the base, a coal cutting mechanism, a supporting table for the coal cutting mechanism arranged to rest directly upon the upper surface of the ring to be rotatably supported thereby, and a plurality of devices secured to the supporting table at points within the outline of the ring to engage the inner surface of the ring and prevent horizontal movement of the table with respect thereto, substantially as set forth.

7. In a coal cutting mechanism, the combination with a movable base, of a horizontal supporting ring mounted on the base, means for adjusting the ring vertically and angularly with respect to the base, a coal cutting mechanism, a supporting table for the coal cutting mechanism arranged to rest directly upon the upper surface of the ring to be rotatably supported thereby, a plurality of devices secured to the supporting table at points within the outline of the ring to engage the inner surface of the ring and prevent horizontal movement of the table with respect thereto, and a plurality of clips connected to the table and provided with parts positioned to engage the lower surface of the ring to prevent upward movement of the table with respect to the ring, substantially as set forth.

8. In a coal cutting machine, the combination with a movable base, of a horizontal supporting ring mounted on the base and normally fixed against movement with respect thereto, a coal cutting mechanism, a supporting table for the coal cutting mechanism arranged to rest directly upon the upper surface of the ring to be rotatably supported thereby, the said table having a circular notched periphery projecting outward beyond the outer edges of the ring, a plurality of devices secured to the supporting table at points within the outline of the ring to engage the inner surface of the ring and prevent horizontal movement of the table with respect thereto, a latch mounted on the outside of the ring to move vertically into or out of engagement with one of the notches of the table to lock the table against movement, and means for securing the latch in either its upper operative position or its lower inoperative position, substantially as set forth.

9. In a coal cutting machine, the combination with a base, of a laterally extending coal cutting mechanism comprising a table rotatable relatively to the base, a winding drum mounted upon the table, a cable adapted to be wound upon the drum and to be attached at its other end to a point external to the table, a power device, and power transmitting mechanism comprising a friction clutch between the power device and the drum whereby the drum may be rotated to wind the cable and thereby rotate the table relatively to the base, substantially as set forth.

10. In a coal cutting machine, the combination with a base, of a coal cutting mechanism extending laterally from the base and comprising a table rotatable relatively to the base, a winding drum mounted upon the table, a cable adapted to be wound upon the drum and adapted to be attached at its other end to a point external to the table, a power device, transmitting mechanism comprising a friction clutch between the power device and the drum whereby the drum may be rotated to wind the cable and thereby rotate the table relative to the base, and means for adjusting the power transmitting capacity of the friction clutch, substantially as set forth.

11. In a coal cutting machine, the combination with a movable base, of a coal cutting mechanism extending laterally from the base and comprising a table rotatable relatively to the base, a winding drum on the table, a plurality of sheaves mounted on vertical axes and arranged circumferentially about the table, a cable adapted to be wound upon the drum, to pass over the sheaves and to be connected at its other end to a point external to the table, and means for rotating the drum to wind the cable and thereby rotate the table, substantially as set forth.

12. In a coal cutting machine, the combination of a linearly movable base, a cutter frame mounted on the base for movement about a vertical axis and having an elongated cutter arm extending horizontally from the base in planes near the top of the frame, an endless cutter chain on the arm, a motor on the frame below the planes of the cutter chain, gearing for transmitting the power of the motor to drive the cutter chain, a winding drum on the frame, gearing for transmitting the power of the motor to drive the drum, a cable connected at one end to the drum to be wound thereon and adapted to be connected at the other end to a point external to the cutter frame, and cable guide pulleys on the frame in planes below the planes of the cutter chain, the pulleys being at points remote from the axis of rotation of the frame whereby the cable tends, when the drum is rotated, to turn the frame and the cutter chain about the said axis.

13. In a coal cutting machine, the combination with a base, of a coal cutting mechanism extending horizontally from the base and comprising a table rotatable relatively to the base, a winding drum on the table, a cable adapted to be mounted upon the drum and to be fastened at its other end to a point external to the table, a power device, a clutch between the power device and the drum whereby the drum may be rotated to wind the cable and thereby rotate the table, said clutch being adapted to be released to permit the drum to rotate to unwind the cable without rotating the power device, substantially as set forth, 14. In a coal cutting machine, the combination of a base, a coal cutting mechanism extending horizontally from the base and comprising a table rotatable relatively to the base, a winding drum on the table, means for rotating the drum, a cable adapted to be wound upon the drum, and attaching means for the other end of the cable mounted upon the base whereby the winding of the cable on the drum will serve to rotate the table relatively to the base, substantially as set forth.

15. In a coal cutting machine, the combination of a base, a framework adjustable vertically and angularly relatively to the base, a coal cutting mechanism extending horizontally from the base and comprising a table rotatable relatively to the said framework, a rotatable drum mounted upon the table, a cable adapted to be wound upon the drum, and a plurality of cable holders mounted upon the adjustable framework to one of which the end of the cable may be attached to cause the movement of the table relative to the framework, as the cable is wound upon the drum, substantially as set forth.

16. In a coal cutting machine, the combination of a base frame, supporting track wheels therefor, a cutter apparatus movable as a unit with respect to the base frame about a normally vertical axis and comprising a motor and a continuously acting kerf cutting mechanism driven by the motor and extending outward beyond the base frame along normally horizontal lines, a rotatable drum mounted on the said cutter apparatus, a plurality of idler sheaves mounted in an arcuate row on the said apparatus for rotation about vertical axes, a cable engaging the drum to be wound thereon and passing around the said idler sheaves, and a plurality of circumferentially spaced devices mounted on the base frame and held against turning with the cutter apparatus, each adapted for the attachment of the cable to cause the cutter apparatus to turn when the cable is wound.

17. In a coal cutting machine, the combination of a wheel-supported truck, a cutter apparatus mounted on and extending forward from the truck and adapted to swing horizontally across the front end thereof while cutting, a power driven reel movable horizontally with the cutting apparatus, a cable connected to the reel, and a plurality of guide sheaves for the cable mounted on the machine and adapted to give the cable fair lead in various directions in relation to the reel.

18. In a coal cutting machine, the combination of a linearly movable base, a cutter frame mounted on the base for movement about a vertical axis, and having an elongated cutter arm extending horizontally from the base in planes near the top of the frame, an endless cutter chain on the arm, a motor on the frame below the planes of the cutter arm, gearing for transmitting the power of the motor to drive the cutter chain, a winding drum on the frame, gearing for transmitting the power of the motor to drive the drum, a cable connected at one end to the drum to be wound thereon and adapted to be connected at the other end to a point external to the machine, cable guide pulleys on the frame in planes below the planes of the cutter arm, the pulleys being at points remote from the axis of rotation of the frame whereby the cable tends, when the drum is rotated, to turn the frame and the cutter arm about the said axis, and a manually controllable lock for holding the frame and cutter arm against rotation with respect to the base, whereby the cable tends, when the lock is in operative position and when the drum is rotated, to linearly move the machine as a whole.

19. In a wheel supported coal mining machine adapted to be transported over mine tracks and to cut a horizontal kerf while supported on a track extending longitudinally toward the face of the coal, the combination of a base frame, track wheels supporting said frame, cutter apparatus supported by and projecting horizontally from the base frame, said cutter apparatus being movable laterally in relation to the base frame while supported thereby to cut a kerf extending transversely across the track on which the machine stands, devices for driving the cutter apparatus, for moving said apparatus laterally, and for rotating the track wheels to transport the machine from one working place to another, motor devices carried by the base frame for actuating the aforesaid devices, and means connected with the machine adapted to afford a supply of motive power to the motor devices when the machine is being transported over a mine track and when it is in operation thereon at the face of the coal.

20. In a wheel supported coal mining machine adapted to be transported over mine tracks and to cut a horizontal kerf while supported on a track extending longitudinally toward the face of the coal, the combination of a base frame, track wheels supporting said base frame, cutter apparatus supported by and projecting horizontally from the base frame, said cutter apparatus being movable laterally in relation to the base frame while supported thereby to cut a kerf extending transversely across the track on which the machine stands, devices for driving the cutter apparatus, for moving said apparatus laterally in relation to the base frame, and for rotating the track wheels to transport the machine from one working place to another, motor devices for actuating the aforesaid devices, and means for supplying motive power to said motor devices comprising a flexible conductor for the power medium, said flexible conductor being connected at one end to the machine and connectible at its other end to a source of power.

21. In a wheel supported coal mining machine adapted to be transported over mine tracks and to cut a horizontal kerf while supported on a track extending longitudinally toward the face of the coal, the combination of a base frame, track wheels supporting said base frame, cutter apparatus supported by and projecting horizontally from said base frame, said cutter apparatus being movable laterally in relation to the base frame while supported thereby to cut a kerf extending transversely across the track on which the machine stands, devices for driving the cutter apparatus, for moving said apparatus laterally in relation to the base frame, and for rotating the track wheels to transport the machine from one working place to another, electric motor devices for actuating the aforesaid devices, and means for supplying energizing current to said motor devices comprising a reel connected to and movable with the machine and a flexible conductor connected at one end to the reel and adapted to have its other end connected to a source of current supply.

22. In a wheel supported coal mining machine adapted to be transported over mine tracks and to cut a horizontal kerf while supported on a track extending longitudinally toward the face of the coal, the combination of a base frame, track wheels supporting said base frame, cutter apparatus supported by and projecting horizontally from said base frame, said cutter apparatus being movable laterally in relation to the base frame while supported thereby to cut a kerf extending transversely across the track on which the machine stands, means for moving the cutter apparatus laterally as aforesaid, electric motor devices on the machine, and manually controllable driving connections between the motor devices and the cutter apparatus, the means for laterally moving the cutter apparatus, and the track wheels.

23. In a coal cutting machine, the combination of a truck having axles and wheels connected thereto, of a vertically adjustable frame on the truck, a horizontally projecting coal cutting mechanism on the frame adapted when fed against the coal to cut a horizontally extending kerf, a motor on the frame, a power transmitting element on the frame, means for operatively connecting the said power transmitting element to one axle, and means for operatively connecting the motor to either the coal cutting mechanism or the power transmitting element and disconnecting it from the other.

24. In a coal cutting machine, the combination of a truck comprising axles and wheels connected thereto, a cutter frame vertically adjustable on the truck, a cutter chain on the frame, said cutter frame and chain projecting horizontally from the truck and being adapted when fed against the coal to cut a horizontally extending kerf, a motor on the frame connected with the cutter chain, a sprocket wheel on the frame and connected to the motor, a sprocket wheel operatively connected to one of the axles and adapted to be moved relatively thereto, and a chain adapted to pass over the two sprocket wheels, substantially as set forth.

25. In a coal cutting machine, the combination of a truck having axles and wheels connected thereto, a cutter frame vertically adjustable on the truck, a cutter chain on the frame, said cutter frame and chain projecting horizontally from the truck and being adapted when fed against the coal to cut a horizontally extending kerf, a motor on the frame connected with the cutter chain, a sprocket wheel connected to the motor and bodily movable therewith, a sprocket wheel operatively connected to one of the axles, a chain adapted to pass over the two sprocket wheels, and means for moving one of the sprocket wheels with respect to its support to regulate the tension of the chain, substantially as set forth.

26. In a coal cutting machine, the combination of a truck having axles and wheels connected thereto, a cutter frame vertically adjustable on the truck, a cutter chain on the frame, a motor on the frame connected with the cutter chain, a sprocket wheel connected to the motor and bodily movable therewith, a bearing bracket adjustably mounted on one of the axles, a jack shaft rotatable in the bearing bracket and parallel to the axle, gearing between the jack shaft and the axle, a sprocket wheel on the jack shaft, a chain adapted to connect the two sprocket wheels, and means for moving the bearing bracket about the axle, substantially as set forth.

27. In a coal cutting machine, the combination of a truck having axles and wheels connected thereto, a cutter frame vertically adjustable on the truck, a cutter chain on the frame, a motor on the frame connected with the cutter chain, a sprocket wheel connected to the motor and bodily movable therewith, a bearing bracket rotatable about one of the axles, a jack shaft rotatable on the bearing bracket and parallel to the axle, gearing between the jack shaft and the axle, a sprocket wheel on the jack shaft, a chain adapted to connect the two sprocket wheels, a worm gear segment on the bearing bracket, a worm on the truck adapted to engage the worm to change the position of the bearing bracket, substantially as set forth.

28. In a coal cutting machine, the combination of a truck having axles and wheels connected thereto, of a vertically adjustable cutter frame on the truck, a cutter chain on the frame, a sprocket wheel on the frame, a motor on the frame, means for operatively connecting the motor to either the cutter chain or the sprocket wheel, a sprocket wheel operatively connected to one axle, and a chain adapted to connect the two sprocket wheels, the sprocket wheel connected to the axle being adapted to be moved relative thereto to accommodate itself to the vertical adjustment of the other sprocket wheel, substantially as set forth.

29. In a system of coal mining apparatus comprising a ground supported track and a portable mechanism adapted to be transported over and remain permanently upon and be braced by said track, and also adapted to cut a horizontal kerf in a coal face while supported on a section of track extending longitudinally toward said face, the combination of a rigid base frame, wheels secured to said base frame and resting upon and braced by said track section, a narrow elongated cutter arm carried by the base frame and movable horizontally and laterally across the front thereof, its forward end extending horizontally to points outside of and remote from the vertical bounding lines of the base frame and its rear end extending back over the base frame, supporting connections between the rear end of the cutter arm and the base frame comprising a horizontally widely extended rotary brace structure disposed directly above the wheel base of the base frame, a cutter chain mounted to move in a horizontal path around the periphery of the arm, power mechanism for driving the chain, power mechanism constructed and arranged to move the arm laterally from points at one side of the track to points at the other side thereof, and motor devices carried by the base frame for actuating the said power mechanisms, the said parts being arranged as described whereby there may be formed an elongated horizontally extended kerf across the front end of the machine.

30. In a system of coal mining apparatus comprising a ground supported track and a portable mechanism adapted to be transported over and remain permanently upon and be braced by said track, and also adapted to cut a horizontal kerf in a coal face while supported on a section of track extending longitudinally toward said face, the combination of a rigid base frame, wheels secured to said base frame and resting upon and braced by said track section, a narrow elongated cutter arm carried by the base frame and movable horizontally and laterally across the front thereof, its forward end extending horizontally to points outside of and remote from the vertical bounding lines of the base frame and its rear end extending back over the base frame, supporting connections between the rear end of the cutter arm and the base frame comprising a horizontally widely extended rotary brace structure disposed directly above the wheel base of the base frame, a cutter chain mounted to move in a horizontal path around the periphery of the arm, motor devices carried by the base frame, and power devices whereby the power of said motor devices is caused to drive the cutter chain and to move the arm laterally from points at one side of the track to points at the other side thereof, thereby forming an elongated horizontally extended kerf across the front end of the machine.

31. In a system of coal mining apparatus comprising a ground supported track and portable mechanism adapted to be transported over and remain permanently upon and be braced by said track, and also adapted to cut a horizontal kerf in a coal face while supported on a section of track extending longitudinally toward said face, the combination of a rigid base frame, wheels secured to said base frame and resting upon and braced by said track section, a narrow elongated cutter arm carried by the base frame in elevated horizontal planes above the other parts of the apparatus and movable horizontally and laterally across the front of the base frame, said arm having its forward end extending horizontally to points outside of and remote from the vertical bounding lines of the base frame and its rear end extending back over the base frame, supporting connections between the rear end of the cutter arm and the base frame comprising a horizontally widely extended rotary brace structure disposed directly above the wheel base of the base frame, a cutter chain mounted to move in a horizontal path around the periphery of the arm, power mechanism for driving the chain, power mechanism constructed and arranged to move the arm laterally from points at one side of the track to points at the other side thereof, and motor devices carried by the base frame for actuating the said power mechanisms, the said parts being arranged as described whereby an elongated horizontally extended kerf may be formed in the aforesaid elevated planes across the front of the machine.

32. In a track mounted mining apparatus adapted to cut a horizontal kerf extending across its front from one side of the track to the other, the combination of a rigid base frame, supporting wheels therefore resting upon and braced by the track, a laterally movable cutter arm carried by the base frame and extending therefrom in elevated horizontal planes above the other parts of the apparatus, an endless cutter chain movable along the cutter arm in a path horizontal throughout, a chain driving motor positioned below the cutter arm and fixedly connected thereto to move bodily therewith, and power actuated means below the arm for causing it and the cutter chain to move laterally to cut a horizontal kerf in the aforesaid elevated planes extending transversely from one side to the other of the track.

33. In a track mounted mining apparatus adapted to cut a horizontal kerf extending across its front from one side of the track to the other, the combination of a rigid base frame, supporting wheels therefor resting upon and braced by the track, a laterally movable rigid cutter arm carried by the base frame and extending therefrom in elevated normally horizontal planes above the other parts of the apparatus, an endless cutter chain movable along the cutter arm in a path normally horizontal throughout, devices below the said arm for adjusting the arm angularly to cause the cutting planes to be inclined or vertically in parallelism to move the cutter chain from one set of relatively elevated cutting planes to another set of more elevated cutting planes, a chain driving motor positioned below the cutter arm and fixedly connected thereto to move bodily therewith, and power actuated means below the arm for causing it and the chain to move laterally to cut a horizontal or an inclined kerf at any of several relatively high elevations and extending transversely from one side of the track to the other.

34. In a system of coal mining apparatus comprising a ground supported track and a portable mechanism adapted to be transported over and remain permanently upon and be braced by said track, and also adapted to cut a horizontal kerf in a coal face while supported on a section of track extending longitudinally toward said face, the combination of a rigid base frame, wheels secured to said base frame and resting upon and braced by said track section, a narrow elongated cutter arm carried by the base frame and movable horizontally and laterally across the front thereof, its forward end extending horizontally to points outside of and remote from the vertical bounding lines of the base frame and its rear end extending back over the base frame, supporting connections between the rear end of the cutter arm and the base frame comprising a horizontally widely extended rotary brace structure disposed directly above the wheel base of the base frame and means for adjusting the cutter arm upward and downward, a cutter chain mounted to move in a horizontal path around the periphery of the arm, power mechanism for driving the chain, power mechanism constructed and arranged to move the arm laterally from points at one side of the track to points at the other side thereof, and motor devices carried by the base frame for actuating the said power mechanism, said parts being arranged as described whereby an elongated horizontally extended kerf can be formed at any one of several elevations across the front end of the machine.

35. In a system of coal mining apparatus comprising a ground supported track and a portable mechanism adapted to be transported over and remain permanently upon and be braced by said track, and also adapted to cut a horizontal kerf in a coal face while supported on a section of track extending longitudinally toward said face, the combination of a rigid base frame, wheels secured to said base frame and resting upon and braced by said track section, a narrow elongated cutter arm carried by the base frame and movable horizontally and laterally across the front thereof, its forward end extending horizontally to points outside of and remote from the vertical bounding lines of the base frame and its rear end extending back over the base frame, supporting connections between the rear end of the cutter arm and the base frame comprising a horizontally widely extended rotary brace structure disposed directly above the wheel base of the base frame and means for adjusting the cutter arm upward and downward, a cutter chain mounted to move in a horizontal path around the periphery of the arm, motor devices carried by the base frame, and power devices whereby the power of said motor devices is caused to drive the cutter chain and to move the arm laterally from points at one side of the track to points at the other side thereof, thereby forming an elongated horizontally extended kerf across the front end of the machine at any one of several elevations.

36. In a track mounted mining apparatus adapted to cut a horizontal kerf extending across its front from one side of the track to the other, the combination of a rigid base frame, supporting wheels therefor resting upon and braced by the track, a laterally movable cutter arm carried by the base frame and extending horizontally therefrom, an endless cutter chain movable along the cutter arm in a horizontal path, a chain driving motor fixedly connected to the cutter arm to move bodily therewith, means for bodily adjusting the arm vertically in parallelism to move the cutter chain from one set of relatively low cutting planes to another set of relatively high cutting planes, and power actuated means constructed and arranged to cause the arm and the chain to move laterally to cut a horizontal kerf at any one of several elevations and extending transversely from one side to the other of the track.

37. In a system of coal mining apparatus comprising a ground supported track and a portable mechanism adapted to be transported over and remain permanently upon and be braced by said track, and also adapted to cut a horizontal kerf in a coal face while supported on a section of track extending longitudinally toward said face, the combination of a rigid base frame, wheels secured to said base frame and resting upon and braced by said track section, a narrow elongated cutter arm carried by the base frame and movable horizontally and laterally across the front thereof, its forward end extending horizontally to points outside of and remote from the vertical bounding lines of the base frame and its rear end extending back over the base frame, supporting connections between the rear end of the cutter arm and the base frame adapted to permit the arm to swing laterally and comprising a plurality of upright supports upon which the cutter arm is adjustable upward and downward, said supports being arranged at the angles of a horizontal polygon directly above the wheel base of the base frame; a cutter chain mounted to move in a horizontal path around the periphery of the arm, motor devices carried by the base frame, and power devices whereby the power of said motor devices is caused to drive the cutter chain and to move the arm laterally from points at one side of the track to points at the other side thereof, thereby forming an elongated horizontally extended kerf across the front end of the machine.

38. In a system of coal mining devices comprising a track extending longitudinally toward the coal face and a mining mechanism thereon arranged to cut kerfs which extend across the central longitudinal vertical plane of the track, the combination of a wheeled truck resting on and braced by the track, three vertically elongated guide supports respectively at the angles of a triangle in horizontal plan directly above the truck, a frame vertically adjustably connected to each of said guide supports independently of the others and forming a relatively widely extended base directly above the truck, and a horizontal kerf cutter supported at its rear end on said vertically adjustable frame and extending forward to points in front of the truck and adapted to be moved, while cutting, laterally across the longitudinal vertical planes of the truck.

39. In a coal cutting machine, the combination of a rigid base frame, three triangularly arranged upright supporting devices fixedly mounted on the base frame, a supporting frame mounted on the said devices and otherwise freely movable as a unit vertically with respect to the base frame, a cutter apparatus mounted on the supporting frame and swingable horizontally relatively thereto, the said apparatus comprising a motor and a continuously acting kerf cutting mechanism driven by the motor and extending outward beyond the base frame along normally horizontal lines, and means adapted in cooperation with the said supporting devices to move the cutter supporting frame and the cutter apparatus vertically or angularly with respect to the base frame.

40. In a system of coal mining apparatus comprising a ground supported track and a portable mechanism adapted to be transported over and remain permanently upon and be braced by said track, and also adapted to cut a horizontal kerf in a coal face while supported on a section of track extending longitudinally toward said face, the combination of a rigid base frame, wheels secured to said base frame and resting upon and braced by said track section, a narrow elongated cutter arm carried by the base frame and movable horizontally and laterally across the front thereof, its forward end extending horizontally to points outside of and remote from the vertical bounding lines of the base frame and its rear end extending back over the base frame, supporting connections between the rear end of the cutter arm and the base frame comprising a horizontally widely extended rotary brace structure disposed directly above the wheel base of the base frame, a cutter chain mounted to move in a horizontal path around the periphery of the arm, power mechanism for driving the chain, power mechanism constructed and arranged to move the arm laterally from points at one side of the track to points at the other side thereof, thereby forming an elongated horizontally extending kerf across the front end of the machine, motor devices carried by the base frame for actuating the said power mechanisms, and means for angularly adjusting the cutter arm in relation to the base frame to cause the plane of the kerf to be inclined.

41. In a system of coal mining apparatus comprising a ground supported track and a portable mechanism adapted to be transported over and remain permanently upon and be braced by said track, and also adapted to cut a horizontal kerf in a coal face while supported on a section of track extending longitudinally toward said face, the combination of a rigid base frame, wheels secured to said base frame and resting upon and braced by said truck section, a narrow elongated cutter arm carried by the base frame and movable horizontally and laterally across the front thereof, its forward end extending horizontally to points outside of and remote from the vertical bounding lines of the base frame and its rear end extending back over the base frame, supporting connections between the rear end of the cutter arm and the base frame comprising a horizontally widely extended rotary brace structure disposed directly above the wheel base of the base frame, a cutter chain mounted to move in a horizontal path around the periphery of the arm, power mechanism for driving the chain, power mechanism constructed and arranged to move the arm laterally from points at one side of the track to points at the other side thereof, thereby forming an elongated horizontally extending kerf across the front end of the machine, motor devices carried by the base frame for actuating the said power mechanism, and means for adjusting the cutter arm angularly, to cause the plane of the kerf to be inclined, or vertically in parallelism to vary the elevation of the kerf.

42. In a track mounted mining apparatus adapted to cut a horizontal kerf extending across its front from one side of the track to the other, the combination of a rigid base frame, supporting wheels therefor resting upon and braced by the track, a narrow elongated laterally movable cutter arm carried by the base frame and extending horizontally therefrom, an endless cutter chain movable along the cutter arm in a path horizontal throughout, devices for adjusting the arm angularly to cause the cutting planes to be inclined or vertically in parallelism to move the cutter chain from one set of relatively low cutting planes to another set of relatively high cutting planes, a chain driving motor fixedly connected to the cutter arm to move bodily therewith, and motor actuated means for causing the arm and the chain to move laterally to cut a horizontal kerf at any of several elevations or inclinations and extending transversely from one side of the track to the other.

43. In a coal cutting machine, the combination of a wheel supported rigid base frame, a supporting frame vertically, adjustably mounted on the base frame, a cutter frame on the supporting frame movable with respect to the supporting frame about a normally vertical axis and having a cutter arm extending from the base frame along normally horizontal lines above the other parts of the machine, an endless cutter chain mounted on the cutter arm, a motor on the cutter frame, gearing for transmitting the power of the motor to drive the cutter chain, and means for adjusting the supporting frame, together with the cutter frame, vertically with respect to the base frame or angularly with respect to the base frame about any one of a plurality of horizontal axes at angles to each other.

44. In a coal cutting machine, the combination of a movable base frame, supporting track wheels therefor, a cutter apparatus movable as a unit with respect to the base frame about a normally vertical axis and comprising a motor and a continuously acting kerf cutting mechanism driven by the motor and extending outward beyond the base frame along normally horizontal lines near the uppermost plane of the machine, the said cutter mechanism being movable across one end of the machine about the said vertical axis through an arc extending at each side beyond the vertical plane of the corresponding track wheels, means for locking the cutter apparatus to the base frame at any of several angles, and continuously operable devices connected with the said motor for turning the cutter apparatus about the said vertical axis while in operation, or for moving the machine bodily on its wheels while the cutting apparatus is in operation and locked against turning.

45. In a wheel supported coal mining machine adapted to be transported over mine tracks and to cut a horizontal kerf while supported on a track extending longitudinally toward the face of the coal, the combination of a base frame, track wheels supporting said frame, a frame carried by the base frame and mounted to turn in relation thereto in normally horizontal planes, continuously acting cutter devices carried by the turning frame and adapted when said frame turns to cut a horizontal kerf extending transversely across the track on which the machine stands, means for turning the last named frame, a motor for actuating the turning means, said motor being mounted to move bodily with the turning frame, mechanism for rotating the track wheels to transport the machine, and means for operatively connecting the aforesaid motor to said mechanism when the turning frame is in a predetermined position in relation to the base frame.

46. In a wheel supported coal mining machine adapted to be transported over mine tracks and to cut a horizontal kerf while supported on a track adjacent the face of the coal, the combination of a base frame, track wheels supporting said frame and adapted to maintain it in alinement with the track, a horizontally extending cutter mechanism carried by the base frame and mounted to move from one operative position to another in relation to said frame, a motor connected to drive the cutter mechanism and mounted to move bodily with said mechanism when it is moved as aforesaid, feed mechanism driven by the said motor for moving the cutter mechanism in relation to the base frame during the cutting operation, and a separable train of gearing between the motor and the track wheels adapted to permit the motor to move bodily and to transmit the power of the motor to rotate the wheels when the motor is in a predetermined position.

47. In a system of coal mining devices of the class described, the combination of a wheeled truck adapted to run upon and be laterally braced by a track extending longitudinally toward a vertical coal face, cutter mechanism supported upon and movable horizontally, while cutting, across the front end of the truck, a motor movable with the cutter mechanism, means for vertically adjusting the motor and the cutting mechanism in horizontal parallelism and adapted to hold it either where it will form a kerf in relatively low horizontal planes or where it will form a kerf in other horizontal planes relatively higher than those aforesaid, and power actuated mechanism on the truck for causing the said transverse movement of the cutter mechanism, across the front end of the truck while in operation.

48. In a system of coal mining devices comprising a centrally arranged track and mining apparatus thereon arranged to cut kerfs which extend across the central longitudinal vertical plane of the track, the combination of a wheeled truck, a series of upright guide columns on the truck respectively situated at the angles of a polygon in a horizontal plan, a cutter frame extending from the central part of said polygon forward horizontally to points in front of the truck, a cutter chain moving around the said cutter frame, a chain driving motor movable with the cutter frame, means connected to the cutter frame and engaging each of the said columns respectively for vertically adjusting the motor and the cutter frame thereon, and power devices for swinging the cutter mechanism transversely, while in operation, across the front end of the truck.

49. In a system of coal mining devices comprising a centrally arranged track and a mining apparatus thereon arranged to cut kerfs which extend across the central longitudinal vertical plane of the track, the combination of a wheeled truck, a series of vertically elongated guide supports respectively at the angles of a polygon in horizontal plan directly above the truck, a frame connected to each of said guide supports and vertically adjustable thereon forming a relatively widely extended base within said polygon above the truck, and a horizontal kerf cutter supported at its rear end at points on said vertically adjustable frame within said polygon and extending forward to points in front of the truck and adapted to be moved, while cutting, transversely across the longitudinal planes of the truck.

50. In a system of coal mining devices comprising a centrally arranged track and a mining apparatus thereon arranged to cut kerfs which extend across the central longitudinal vertical plane of the track, the combination of a wheeled truck, a series of vertically elongated guide supports respectively at the angles of a polygon in horizontal plan directly above the truck, a frame connected to each of said guide supports and vertically adjustable thereon forming a relatively widely extended base within said polygon above the truck, a horizontal kerf cutter supported at its rear end at points on said vertically adjustable frame within said polygon and extending forward to points in front of the truck and adapted to be moved, while cutting, transversely across the longitudinal planes of the truck, and a motor for actuating the cutters movably mounted on the said vertically adjustable frame in fixed relations to the cutting apparatus.

51. In a system of coal mining devices comprising a centrally arranged track and a mining aparatus thereon arranged to cut kerfs which extend across the central longitudinal vertical plane of the track, the combination of a wheeled truck, a series of vertically elongated upwardly extending columns positioned at the angles of a relatively widely extended horizontal polygon above the truck, a frame within the vertical lines of the said polygon adjustably supported on each of the said columns, a cutter frame connected at points within the polygon to the vertically adjustable frame and extending from points therein to points in front of the truck, a motor carried by the truck, and power transmitting means whereby the motor can cause the cutter frame to swing, while cutting, transversely across the longitudinal vertical planes of the truck.

52. In a system of coal mining apparatus comprising a ground supported track and a portable mechanism adapted to be transported over and remain permanently upon and be braced by said track, and also adapted to cut a horizontal kerf in a coal face while supported on a section of track extending longitudinally toward said face, the combination of a rigid base frame, wheels secured to said base frame and resting upon and braced by said track section, a narrow elongated cutter arm carried by the base frame and movable horizontally and laterally across the front thereof, its forward end extending horizontally to points outside of and remote from the vertical bounding lines of the base frame and its rear end extending back over the base frame, supporting connections between the rear end of the cutter arm and the base frame comprising a horizontally widely extended rotary brace structure disposed directly above the wheel base of the base frame, a cutter chain mounted to move in a horizontal path around the periphery of the arm, means operable at will for locking the cutter arm against lateral movement, power devices for driving the cutter chain, for moving the arm laterally from points at one side of the track to points at the other side thereof, and for moving the cutter arm and chain bodily forward and backward toward and from the coal face when the arm is locked against lateral movement, and motor devices carried by the base frame for actuating the said power devices.

53. In a system of coal mining apparatus comprising a ground supported track and a portable mechanism adapted to be transported over and remain permanently upon and be braced by said track, and also adapted to cut a horizontal kerf in a coal face while supported on a section of track extending longitudinally toward said face, the combination of a rigid base frame, wheels secured to said base frame and resting upon and braced by said track section, a narrow elongated cutter arm carried by the base frame and movable horizontally and laterally across the front thereof, its forward end extending horizontally to points outside of and remote from the vertical bounding lines of the base frame and its rear end extending back over the base frame, supporting connections between the rear end of the cutter arm and the base frame comprising a horizontally widely extended rotary brace structure disposed directly above the wheel base of the base frame and means for adjusting the cutter arm vertically, a cutter chain mounted to move in a horizontal path around the periphery of the arm, means operable at will for locking the cutter arm against lateral movement, power devices, operable when the cutter arm is in any position of vertical adjustment, for driving the cutter chain, for moving the arm laterally from points at one side of the track to points at the other side thereof, and for moving the cutter arm and chain bodily forward and backward toward and from the coal face when the arm is locked against lateral movement, and motor devices carried by the base frame for actuating the said power devices.

54. In a system of coal mining devices of the class described, the combination of a wheeled truck, a cutter frame extending forward from the truck and adapted to swing across the front end thereof, a cutter driving motor supported on the swinging cutter frame, means for adjusting the motor and the cutter frame vertically for the forming of horizontal kerfs in either of several differing horizontal planes, a power driven reel movable horizontally with the cutter frame, and a cable connected thereto and adapted to cause the forward movement, bodily, of the cutting apparatus.

55. A mining apparatus comprising a track adapted to be positioned perpendicular to a vertical wall in a mine, and a mechanism fitted to said track and adapted, first, to be moved forward and backward thereon, second, to form horizontal kerfs parallel to the track on either side thereof, and, third, to form a transverse kerf in the wall in front of the track extending from one side of the latter to the other side, said mechanism comprising a wheeled truck fitted to said track, cutting means projecting laterally beyond the truck and adapted to form kerfs such as aforesaid, a laterally widely-expanded supporting base-plate carrying the cutting means and positioned above and extending across the wheel-base of the truck, and pivotally mounted thereon, power operated devices whereby the cutting apparatus can be carried from a position on one side of the track where it can lie on horizontal lines at an acute angle to the lines of travel of the truck across the longitudinal vertical planes of said lines of travel to the other side of the truck where it can lie in a position at a similar angle to the said planes, and manually-operable means for holding said supporting means rigid relatively to the truck in either of the said angular positions.

56. In a mining apparatus, including a track adapted to be positioned substantially perpendicular to a wall in a mine, a wheeled truck adapted to be fitted to said track and to move freely forward thereon, cutting means adapted to cut in the mine wall, in front of said track, a kerf extending transversely thereof while moving along the said wall, supporting means carrying the cutting means and pivotally mounted on the truck on a vertical axis, power operated devices, whereby the supporting means are adapted to be rotated horizontally and carry the cutting means, while cutting, across the vertical longitudinal planes of the track, and manually-operable means to lock the supporting means in either of several positions which are on lines at acute forward angles to the lines of travel of the truck, and to hold the cutting means on either side of the truck while so angulated.

57. Coal mining apparatus comprising, in combination, a trackway disposed at substantially right angles to a coal face, a base frame adapted to be moved longitudinally over said trackway toward and away from the coal face, a rotary support mounted on and traveling with said base frame, a cutter arm rigidly mounted on said rotary support so as to be operative for cutting a kerf in substantially horizontal planes, means for locking said rotary support and cutter arm relative to said base frame at any desired horizontal angle to the coal face to make longitudinal cuts in the coal face when the base frame is moved longitudinally of said trackway toward and away from the coal face, self-contained power means for rotating said support and cutter arm on said base frame to make an arcuate cut in the coal face, and means for adjusting said cutter arm vertically with respect to said base frame to permit said cutter arm to cut kerfs in the coal face at different horizontal planes.

58. Coal mining apparatus comprising, in combination, a trackway disposed at substantially right angles to a coal face, a wheeled base frame adapted to be moved longitudinally over said trackway toward and away from the coal face, self-contained power means for traversing said base frame on said trackway, a rotary support mounted on and traveling with said base frame, a cutter arm rigidly mounted on said rotary support so as to be operative for cutting a kerf in substantially horizontal planes, means for locking said rotary support and cutter arm relative to said base frame at any desired horizontal angle to the coal face for making longitudinal cuts in the coal face when the base frame is moved longitudinally of the trackway toward or away from the coal face, self-contained power means for rotating said support and cutter arm on said base frame to make an arcuate cut in the coal face, and means for adjusting said cutter arm vertically with respect to said base frame to permit said cutter arm to cut kerfs in the coal face at different horizontal planes.

59. Coal mining apparatus comprising, in combination, a trackway disposed at substantially right angles to a coal face, a wheeled base frame adapted to be moved longitudinally over said trackway toward and away from the coal face, self-contained power means for traversing said base frame on said trackway, a plurality of supporting members on said base frame, a rotary support mounted on said supporting members for vertical adjustment, a cutter arm rigidly mounted on said rotary support so as to be operative for cutting a kerf in substantially horizontal planes, means for locking said rotary support and cutter arm relative to said base frame at any desired horizontal angle to the coal face for making longitudinal cuts in the coal face when the base frame is moved longitudinally of the trackway toward or away from the coal face, self-contained power means for rotating said support and cutter arm on said base frame to make an arcuate cut in the coal face when the base frame is at rest upon said trackway, and means for adjusting said rotary support vertically on said supporting members to permit said cutter arm to cut longitudinal and arcuate kerfs in the coal face at different horizontal planes.

60. Coal mining apparatus comprising, in combination, a trackway disposed at substantially right angles to a coal face, a wheeled base frame adapted to be moved longitudinally over said trackway toward and away from the coal face, self-contained power means for traversing said base frame on said trackway, a rotary platform of relatively large area mounted on and traveling with said base frame, a cutter arm rigidly mounted on said rotary support and extending outside thereof so as to be operative for cutting a kerf in substantially horizontal planes, means for locking said rotary platform and cutter arm at any desired horizontal angle to the coal face for making longitudinal cuts in the coal face when the base frame is moved longitudinally of the trackway toward or away from the coal face, self-contained power means for rotating said platform and cutter arm on said base frame to make an arcuate cut when the base frame is at rest upon said trackway, and means for adjusting said rotary platform and cutter arm vertically with respect to said base frame to permit said cutter arm to cut kerfs in the coal face at different horizontal planes.

61. Coal mining apparatus comprising, in combination, a trackway disposed at substantially right angles to a coal face, a wheeled base frame adapted to be moved longitudinally over said trackway toward and away from the coal face, self-contained power means for traversing said base frame on said trackway, a rotary platform of relatively large area mounted on and traveling with said base frame, a cutter arm rigidly mounted on said rotary platform and extending outside thereof so as to be operative for cutting a kerf in substantially horizontal planes, an interlocking connection between said rotary platform and said base frame to hold said cutter arm at any desired horizontal angle to the coal face for making longitudinal cuts in the coal face when the base frame is moved longitudinally of the trackway toward or away from the coal face, and means for rotating said platform and cutter arm on said base frame to make an arcuate cut in the coal face when the base frame is at rest upon said trackway.

62. Coal mining apparatus comprising, in combination, a trackway disposed at substantially right angles to a coal face, a wheeled base frame adapted to be moved longitudinally over said trackway toward and away from the coal face, self-contained power means for traversing said base frame on said trackway, a plurality of pedestals rising from said base frame, a supporting frame mounted on said pedestals, a rotary platform of relatively large area mounted on said supporting frame, a cutter arm rigidly mounted on said rotary platform and extending outside thereof so as to be operative for cutting a kerf in substantially horizontal planes, means for locking said rotary platform and cutter arm relative to said base frame at any desired horizontal angle to the coal face for making longitudinal cuts in the coal face when the base frame is moved longitudinally of the trackway toward or away from the coal face, self-contained power means for rotating said platform and cutter arm on said supporting frame to make an arcuate cut in the coal face when the base frame is at rest upon the trackway, and means for adjusting said supporting frame vertically on said pedestals to permit said cutter arm to cut longitudinal and arcuate kerfs in the coal face at different horizontal planes.

In testimony whereof I affix my signature.

NILS D. LEVIN.